United States Patent
Ganapathiappan et al.

(10) Patent No.: US 9,423,709 B2
(45) Date of Patent: Aug. 23, 2016

(54) POLYMER COATED TONER PIGMENTS FOR ELECTROPHOTOGRAPHIC PRINTING

(75) Inventors: Sivapackia Ganapathiappan, Los Altos, CA (US); Manoj K. Bhattacharyya, Palo Alto, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 12/741,550

(22) PCT Filed: Nov. 30, 2007

(86) PCT No.: PCT/US2007/024708
§ 371 (c)(1),
(2), (4) Date: May 5, 2010

(87) PCT Pub. No.: WO2009/070148
PCT Pub. Date: Jun. 4, 2009

(65) Prior Publication Data
US 2010/0239968 A1    Sep. 23, 2010

(51) Int. Cl.
| | |
|---|---|
| *G03G 9/097* | (2006.01) |
| *G03G 9/08* | (2006.01) |
| *C09B 67/08* | (2006.01) |
| *C09C 1/56* | (2006.01) |
| *G03G 9/087* | (2006.01) |

(52) U.S. Cl.
CPC .......... *G03G 9/0806* (2013.01); *C09B 67/0013* (2013.01); *C09C 1/56* (2013.01); *G03G 9/0825* (2013.01); *G03G 9/08726* (2013.01); *G03G 9/08795* (2013.01); *G03G 9/08797* (2013.01)

(58) Field of Classification Search
USPC ............... 430/109.3, 137.11, 137.12, 137.15; 399/222
See application file for complete search history.

(56) References Cited

U.S. PATENT DOCUMENTS

| | | | |
|---|---|---|---|
| 4,241,159 A | 12/1980 | Priem et al. | |
| 4,521,505 A | 6/1985 | Podszun et al. | |
| 4,777,104 A * | 10/1988 | Matsumoto et al. | 430/110.2 |
| 5,298,356 A * | 3/1994 | Tyagi et al. | 430/109.3 |
| 6,194,488 B1 | 2/2001 | Chen | |
| 6,414,052 B1 | 7/2002 | Komura et al. | |
| 6,455,220 B1 | 9/2002 | Cheng | |
| 7,390,606 B2 | 6/2008 | Patel et al. | |
| 2002/0187412 A1 | 12/2002 | You et al. | |
| 2003/0225188 A1 | 12/2003 | Horie | |
| 2005/0009952 A1 | 1/2005 | Qian et al. | |
| 2005/0142477 A1 | 6/2005 | Qian et al. | |
| 2005/0238984 A1 | 10/2005 | Kaburagi | |
| 2006/0166126 A1 | 7/2006 | Iwase et al. | |
| 2007/0065742 A1 * | 3/2007 | Ishizuka et al. | 430/106.1 |
| 2007/0087281 A1 | 4/2007 | Patel et al. | |
| 2007/0154832 A1 | 7/2007 | Hong et al. | |
| 2007/0227401 A1 | 10/2007 | Ganschow | |
| 2007/0269730 A1 | 11/2007 | Lee et al. | |

FOREIGN PATENT DOCUMENTS

| | | |
|---|---|---|
| JP | 63103265 | 5/1988 |
| JP | 2001092199 | 4/2001 |
| JP | 2005029745 | 2/2005 |
| JP | 2006317711 | 11/2006 |
| KR | 1020050098662 | 12/2005 |
| WO | 2007041106 | 4/2007 |

OTHER PUBLICATIONS

Diamond, The Handbook of Imaging Materials, Marcel Dekker, NY, NY 1991, pp. 380-382.*
Supplemental European Search Report, The Hague, Patent Application No. EP07862416, completed Oct. 8, 2010.

* cited by examiner

*Primary Examiner* — Peter Vajda
(74) *Attorney, Agent, or Firm* — Thorpe, North & Western L.L.P.

(57) ABSTRACT

Toner compositions for electrophotographic printing are disclosed, along with methods for making such toners, and printing systems utilizing them. The disclosed process imparts qualities to the toner making it more efficiently and effectively incorporated into printed images.

8 Claims, No Drawings

POLYMER COATED TONER PIGMENTS FOR ELECTROPHOTOGRAPHIC PRINTING

BACKGROUND

In electrophotographic printing, an electrostatic latent image is formed on a photoreceptive surface, and then developed by application of charged toner particles to the image. The resulting toner image is fixed and transferred onto a surface that is to hold the permanent image. The quality of printed electrophotographic images depends at least in part upon the efficiency of development, i.e. how well the available toner is incorporated into the toner image to create a faithful representation of the latent image. Inefficiency in this process can arise from ineffective charging and discharging of individual toner particles or the toner pool as a whole. One result is incomplete development due to failure of poorly charged toner to be incorporated into the toner image; and another can be failure of incorporated particles to be transferred from the photoreceptive surface. Both of these phenomena lead to printed images of inferior quality. An additional concern is the phenomena of "pollution" of the toner pool, i.e. a gradual erosion of printing efficiency over time due to a progressive decrease in the ratio of suitable toner particles to inferior ones. This inefficiency decreases the output capacity of each batch of toner and can result in costly waste over the service life of a printer.

Electrophotographic printing applications can derive benefits from methods and compositions that increase the efficiency and overall effectiveness of the underlying processes. Such benefits include better print quality, longer service life, and greater cost effectiveness.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "electrophotographic" processes refer to dry or liquid electrophotography processes used in creating an electrostatic latent image, transferring particles to the latent image, and transferring the particles to a substrate. Thus, electrophotography is intended to include dry processes involving small particulates, as well as liquid processes where particulates are suspended in a liquid carrier, where the process involves electrophoretic mechanisms for transferring the particles to a latent image and then to a substrate.

As used herein, the term "uniform" refers to a state of relatively even distribution within a range or over an area. With regard to a characteristic exhibited by a surface, the modifier "uniform" indicates that the characteristic is distributed over the surface without substantial discontinuities or differences in magnitude or density.

As used herein, the term "chargeability" refers to the ability of a surface or an object to receive and hold a static electric charge.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 500 should be interpreted to include not only the explicitly recited limits of 1 and about 500, but also to include individual values such as 2, 3, 4, and sub-ranges such as about 10 to 50, about 20 to 100, etc.

Accordingly the present disclosure sets forth a method of making a toner for use in electrophotographic printing, comprising dispersing pigment particles, acrylic monomer, a charge control agent, and an initiator together in a first solvent. An additional step includes activating the initiator to commence polymerization of the acrylic monomer to form a polymer, where the polymer precipitates out of solution to create a polymer coating on the pigment particles. There, each pigment particle can be at least substantially covered by the polymer coating, the polymer coating can be non-crosslinked, and each pigment particle can be uniformly chargeable over its entire surface.

The present disclosure also provides a toner composition comprising a plurality of pigment particles, each substantially encapsulated in a non-crosslinked polymer coating that imparts both a substantially spherical shape and a substantially uniform chargeability to the entire surface of each particle.

The present disclosure additionally provides a system for electrographic printing, comprising a print medium; a drum with a photoreceptive surface on which an electrostatic latent image may be formed; a toner composition; and a transfer apparatus for transferring the toner image onto the print medium. The toner composition can comprise, together with a solvent and charge control agent, a coated particulate toner of pigment particles at least substantially encapsulated in a non-crosslinked polymer coating with each having a substantially uniform chargeability over its entire surface and a substantially spherical shape.

With these general embodiments in mind, and in further detail with respect to each of these embodiments, it is noted that these embodiments can be related to the general process of electrophotographic printing, which is generally known in the printing arts. To briefly summarize this process, an image to be printed is first formed as an electrostatic latent image on a photoreceptive surface, usually situated on a rotating drum. The image is formed by selectively exposing the charged surface to a pattern of light corresponding to the image.

Usually, the areas exposed to light are discharged and charge remains in the unexposed areas. A development subsystem then applies charged toner particles to the photoreceptive surface. The toner is typically a mixture of pigment particles and a carrier material that is capable of carrying a static charge. Having an opposite charge from the charged portions of the surface, the toner is attracted to and sticks to these portions, forming a toner image. This image is then transferred to a print medium by a transfer subsystem that imparts a charge to the medium that is opposite to that of the toner, so that the image is transferred onto the medium by electrostatic attraction. At this point, the transferred image is held to the medium only by this attraction. A fusing subsystem then renders the image permanent by applying enough heat and pressure to cause the toner particles to fuse to each other and to the print medium.

More efficient use of toner in electrophotography is possible when pigment particles are effectively incorporated into the toner image. Development of a latent image involves using electrostatic attraction to draw enough pigment onto the exposed areas of the photoreceptive surface to render a printable form of the image. Pigment particles themselves may have limited capacity for static charge. However, they can be rendered more responsive to a static by associating them with more chargeable carrier materials. This approach often entails dispersing pigment particles with such materials, such as polymer particles. The effectiveness of such an approach is limited by the uniformity of the dispersion, particularly the ability or inability of the polymer particles to associate themselves with each pigment particle uniformly. However, the variety of shapes exhibited by pigments plays a role in the properties of such dispersions. The range of shapes of pigment particles include somewhat spherical, flaky (e.g. kaolin), and needle-shaped (e.g. aragonite). The often irregular shape of pigment particles can hamper uniform association with carrier particles, leaving parts of each pigment particle less able to respond to static forces, and therefore less likely to be incorporated in the developing process.

More efficient toner compositions may be prepared through coating the pigment particles with polymer, in accordance with the methods, compositions, and systems described herein. Once again, however, the irregular shape of the particles presents some difficulty in effectively covering the particles. A common commercial process for coating pigment particles involves milling the particles with polymers. In this the polymers are coated on the pigment in a random fashion, resulting in particles not being completely covered by polymer. Also, even the more completely covered pigment particles will often retain a highly irregular shape. These exposed and irregular particles do not charge uniformly. As stated above, the result is that these particles are less likely to be incorporated into a toner image and successfully transferred than particles that charge and discharge uniformly. Inefficient development decreases the quality of print output by decreasing a printer's ability to render fine detail and accurate color. In addition, due to the nature of the development and transfer process, unincorporated toner remains in the toner pool so that print performance progressively worsens as more of the toner pool is made up of inferior particles. Finally, unusable toner particles are wasted, adding to the overall cost of electrographic printing.

These concerns can be addressed by providing toner particles that are used efficiently in the printing process. Particularly, pigment particles that are more uniform in shape and chargeability can provide an increase in operational efficiency and decreased waste. Accordingly, the present disclosure provides methods, compositions, and systems for achieving just this. As mentioned, a method of making toner particles having polymer coating that provides more a regular surface topology, uniform covering, and uniform chargeability. According to this method, pigment particles are dispersed with acrylic monomer in a solvent. This approach encompasses all pigments used in electrophotography, including carbon blacks, asphaltums, various oxides, sulfates, sulfides, carbonates, phosphides, phosphates, nitrates, and nitrites of alkali metals and alkaline earth metals, Phthalocyanine Blue, Rhodamine B, Benzidine Yellow and so forth. Conventional solvents known in the art, such as paraffins and isoparaffins, mineral spirits, alkyl acetates, silicone oils, and vegetable oils, may be used, as well as oils derived from seeds or any compound that exhibit high resistance (<$13 \times 10e6$ ohms/cm) including small molecular compounds such as toluene, xylenes, heptane, octane, dodecane or halogenated organic compounds. The dispersion can be established by utilizing standard milling processes with apparatus including paint shakers, attritors, or jar mills. Added agitation may be provided by using glass beads or zirconia beads as milling media. The dispersion may also include a radical-forming polymerization initiator. The initiator chosen may depend upon the desired polymer product or a desired means of activation. In one embodiment, a photo initiator is used and activated by exposing the dispersion to light. In an alternative embodiment, a thermal initiator is used, and activation is achieved by heating the dispersion.

The present disclosure produces coated particles by in-situ polymerization of monomers in the dispersion in a batch or semi-batch process. As polymerization proceeds, the solubility of the growing polymer chains decreases, so that once the chains reach a certain molecular weight, they begin to precipitate out of the solution. As the pigment particles are present in the dispersion, the polymer coats the particles. If the growing polymer remains soluble, one or more additions of a second solvent may be made. Often, the second solvent is one in which the particular polymers used are less soluble than they are in the first solvent. As the first solvent becomes more diluted, the polymers can then precipitate out and coat the pigment particles. For example, a dispersion may be initially created in ethyl acetate, and then an isoparaffin solvent may be added to make the dispersion primarily isoparaffin-based. The remaining ethyl acetate can then be removed if desired. However, this is not necessary because ethyl acetate does not interfere in charging since it is an almost neutral compound.

As a result of being present during the in-situ polymerization, the pigment particles are more uniformly coated by the growing polymer than would result from milling pigment with a finished polymer product. Therefore, the resulting particles are each at least substantially covered by a polymer coating. Preferably, each particle is completely covered by polymer coating. An added benefit of the coating process is that the coated particles have a more regular shape, with fewer of the surface irregularities and discontinuities that can hamper charging. According to a more specific embodiment, the particles exhibit a mostly spherical shape. These characteristics combine to make coated toner particles of the present disclosure more uniformly chargeable. Having a smoother and/or more rounded surface allows static charge to collect more densely on the particle and in a more uniform distribution over the entire surface of the coating. This is to be contrasted with a more irregular shape provided by other processes, in which certain portions of the particle would be less densely charged than others or may lack a useful charge altogether.

The monomers utilized in the present disclosure may be chosen and combined so as to impart desired properties to the resulting toner and to prints printed therefrom. In a particular embodiment of the present disclosure, acrylic monomers can be used, which may include suitable (meth)acrylates such as methyl methacrylate, ethyl methacrylate, propyl methacrylate, butyl methacrylate, hexyl methacrylate, octyl methacrylate, lauryl methacrylate, octadecyl methacrylate, ethylhexyl methacrylate, isobutyl methacrylate, cyclohexyl methacrylate, stearyl methacrylate, methyl acrylate, ethyl acrylate, propyl acrylate, butyl acrylate, hexyl acrylate, octyl acrylate, lauryl acrylate, octadecyl acrylate, ethylhexyl acrylate, isobutyl acrylate, styrene, alpha-methylstyrene, p-methylstyrene, vinylbenzyl chloride, vinyl acetate, vinyl benzoate, ethylene glycol monomethacrylate with ethylene oxide units from 1 to 100, vinyl ethers such as vinyl methyl ether, vinyl phenyl ether, vinyl butyl ether, allyl ether, maleimide derivatives such as N-phenyl maleimide and N-methyl maleimide, and combinations thereof. Optionally, one or more acid-containing monomers may be included in the dispersion. These can be chosen to further improve the charging and discharging properties of the resulting polymer coating, or to provide added stability to the dispersion. Such monomers include acrylic acid, methacrylic acid, itaconic acid, maleic acid, methacryloyloxyethyl succinate, styrene sulfonic acid, allyl sulfonic acid and vinyl benzoic acid. Often, acidic monomers are used in amounts of less than about 30 wt %. The charging properties of the toner composition can be further mediated by the presence of charge control agents. Accordingly, a charge control agent may be added to the initial dispersion with the other ingredients. Alternatively, a charge control agent may be added to the particles after encapsulation. In a particular embodiment, aluminum stearate may be used as the charge control agent.

Those having skill in the art, after considering the present disclosure, will appreciate that many properties may be attainable and controllable by carefully choosing the combination of monomers that will constitute the polymer coating. In a particular embodiment, the monomers may be chosen so as to produce polymer coatings having a desired glass transition temperature (Tg). Tg is one factor in determining the amount of heat and pressure needed induce applied toner to form a film and so fuse the printed image to the print medium. Toners requiring fusing temperatures of 130-220° C. are common in the electrographic printing industry. However, generating these temperatures can amount to a significant expenditure of energy over the service life of a printing system. Toner particles having lower Tg require lower heat and pressure to form a print film. Consequently, printing with such toners can consume less energy, because the fusing subsystems need not attain such high temperatures. An added benefit of lower Tg toners is that faster print speeds are possible due to shorter heating times. Using such toners, particularly in printing systems suited for them, can therefore reduce the cost per page printed, making electrographic printing more cost-effective.

Polymer coatings having the desired Tg can be formulated by choosing constituent monomers based on the properties of those monomers. Those having skill in the pertinent arts will understand how Tg and other properties of constituent monomers can contribute to the Tg of a polymer product comprising those monomers. The Fox equation provides one example of this relationship:

$$1/Tg = W_a/T_{ga} + W_b/T_{gb}$$ [Equation 11]

where $T_{ga}$ and $T_{gb}$=the glass transition temperatures of constituent polymers a and b, and $W_a$ and $W_b$=the weight fraction of the constituent polymers a and b. Accordingly, by use of this equation, one can estimate the Tg of a polymer product from the Tgs and weight fraction of the constituent polymers. Conversely, one can also select constituent monomers based on the Tg of each and determine the relative fractions to include in order to formulate a polymer having a desired Tg. Often, polymer coatings of the present disclosure have a Tg above room temperature to allow suspension in solution in liquid toner applications, and to facilitate handling and storage of dry toners. In a particular embodiment, toner compositions are provided with a polymer coating having a Tg of about 20° C. to about 160° C. In a more particular embodiment, the polymer coating has a Tg of from about 50° C. to about 80° C. Accordingly, the present method of making toner composition includes selecting acrylic monomers and combinations of monomers so as to impart to the polymer coating a Tg in these ranges.

The presence of cross-linking in polymer coatings of toner particles can also have a significant effect on film-forming properties of toners. Cross-linking imparts added rigidity to polymers, so that particles coated with crosslinked polymers are less likely to adhere to each other or to a print medium at a given temperature than particles with non-crosslinked coatings. As such, crosslinked polymer coated toner particles often must generally be subjected to higher temperatures in order to fuse them. Toner compositions made according to the present disclosure have non-crosslinked polymer coatings. Such toner compositions therefore form print films more easily, and under lower fusing temperatures and pressures.

The present disclosure also provides a system for electrographic printing using a coated particulate toner comprising pigment particles at least substantially encapsulated in a non-crosslinked polymer coating as set forth above. In a particular embodiment, each pigment particle is completely covered by the polymer coating. As each possesses a uniform polymer coating, the toner particles of this system are uniformly chargeable and dischargeable and exhibit a substantially spherical shape. In one embodiment of this system, the toner particles have polymer coatings having a Tg of about 30° C. to about 100° C. In a more particular embodiment, the polymer coating has a Tg of from about 50° C. to about 80° C. As such, the present system can use lower fusing temperatures and pressures to produce printed images, and thereby provide more cost- and energy-effective printing over its service life.

The electrostatic properties of the toner particles also contribute to increased cost-effectiveness. The polymer coating imparts a more uniform chargeability to the entire surface of each particle, making each particle more effectively incorporated in developing the latent image. Similarly, toner images incorporating such particles are more effectively transferred, because the toner particles are more uniformly discharged. As a consequence, the entire toner pool in the system is more uniform and therefore can be used more effectively and efficiently in image development and transfer. In accordance with the present disclosure, substantially all of the toner used in developing a latent image can be and is incorporated into a toner image. Another result of this efficiency is the reduction of the phenomenon of toner pollution. More uniformly chargeable and dischargeable toner means that less of the available toner pool is unusable. It follows, therefore, that in a system according to the present disclosure substantially all of the available toner pool can be used over the life of the system or of the toner cartridge.

EXAMPLES

The following examples illustrate various aspects of the toner prepared in accordance with embodiments of the present invention. The following examples should not be considered as limitations of the invention, but should merely teach how to make the best known toners, reflecting the present disclosure.

Example 1

Dispersion of Pigment in Ethyl Acetate

A carbon black (4 g) was mixed with ethyl acetate (21 g) and zirconia beads of size 1 mm (50 g). This mixture was shaken in a paint shaker for 4 h to obtain a dispersion.

Example 2

Dispersion of Pigment in Isopar L

A carbon black (5 g) was mixed with isopar L (20 g), aluminum stearate (0.5 g) and zirconia beads of size 1 mm (60 g). This mixture was shaken in a paint shaker for 4 h to obtain a dispersion.

Example 3

Polymer Coated Pigment Particles

The pigment dispersion from Example 1 (5 g) was mixed with methyl methacrylate (2.72 g), benzyl methacrylate (0.32 g) and octadecyl acrylate (0.16 g), azobisisobutyronitrile (0.15 g) and ethyl acetate (11 g). This slurry was stirred well while heating to 75° C. for 5 h. This solution was added to isopar L (50 ml) to bring the dispersion to isopar L.

Example 4

Polymer Coated Pigment Particles

The pigment dispersion from Example 2 (4.08 g) was mixed with a mixture of methyl methacrylate (3.168 g), octadecyl acrylate (0.032 g), azobisisobutyronitrile (0.15 g) and isopar L (2 g). This slurry was stirred well while heating to 95 C for 18 h. The bigger particles were filtered with 200 micron filters to obtain polymer coated carbon black particles.

Example 5

Testing the Chargeability of Polymer Coated Carbon Black Particles

Particles made according to the present disclosure, including the particles prepared in Examples 3 and 4, can be adequately and uniformly charged to a level acceptable for commercial printing application (e.g. electrophotography). To demonstrate this, a 0.25 dilution of the ink in Example 4 was made by adding Isopar-L. A commercially available charge control agent (HP Indigo for Series 2 machines) was added to the solution in the amount of 50 mg/gm of non-volatile toner solids. After adequate shaking in a paint shaker, this ink was tested for high field conductivity. High field conductivity of approximately 30 pS/cm was observed, which corresponds to over 200 pS/cm when scaled up to a 2% solution. It was also observed that the ink particles were uniformly negative as, on a visual inspection, all of the pigments were attached with the positive electrode of the conductivity measurement cell.

It to be understood that the above-referenced arrangements are illustrative of the application for the principles of the present invention. Thus, while the present invention has been described above in connection with the exemplary embodiments of the invention, it will be apparent to those of ordinary skill in the art that numerous modifications and alternative arrangements can be made without departing from the principles and concepts of the invention as set forth in the claims.

What is claimed is:

1. A method of making a toner for use in electrophotographic printing, comprising:
    (a) dispersing pigment particles, acrylic monomer, acidic monomer, an initiator, and optionally a charge control agent together in a first solvent so as to create a dispersion;
    (b) activating the initiator; and
    (c) conducting polymerization of the acrylic monomer and the acidic monomer to form a polymer, where the polymer precipitates out of solution to create a polymer coating on the pigment particles, wherein each pigment particle is at least substantially covered by the polymer coating, the polymer coating is non-crosslinked and has a Tg of from about 20° C. to about 160° C., and each pigment particle is uniformly chargeable over its entire surface.

2. The method of claim 1, comprising the further step of adding to the dispersion a second solvent in which the polymer has a lower solubility than in the first solvent.

3. The method of claim 1, wherein the dispersing step is accomplished by milling.

4. The method of claim 1, wherein the initiator is a thermal initiator and the activating step is accomplished by heating.

5. The method of claim 1, wherein the initiator is a photo initiator and the activating step is accomplished by exposing to light.

6. The method of claim 1, wherein the acrylic monomer is selected from the group consisting of: methyl methacrylate, ethyl methacrylate, propyl methacrylate, butyl methacrylate, hexyl methacrylate, octyl methacrylate, lauryl methacrylate, octadecyl methacrylate, ethylhexyl methacrylate, isobutyl methacrylate, cyclohexyl methacrylate, stearyl methacrylate, methyl acrylate, ethyl acrylate, propyl acrylate, butyl acrylate, hexyl acrylate, octyl acrylate, lauryl acrylate, octadecyl acrylate, ethylhexyl acrylate, isobutyl acrylate, styrene, alpha-methyl styrene, p-methyl styrene, vinylbenzyl chloride, vinyl acetate, vinyl benzoate, ethylene glycol monomethacrylate with ethylene oxide units from 1 to 100, vinyl ethers, maleimide derivatives, and combinations thereof.

7. The method of claim 1, wherein the acidic monomers are selected from the group consisting of: acrylic acid, methacrylic acid, itaconic acid, maleic acid, methacryloyloxyethyl succinate, styrene sulfonic acid, allyl sulfonic acid, vinyl benzoic acid, and combinations thereof.

8. The method of claim 1, wherein the acrylic monomer is selected, along with other components, so as to impart to the polymer coating a Tg of from about 50° C. to about 80° C.

* * * * *